UNITED STATES PATENT OFFICE

2,469,414

CHLORATE CANDLES AS OXYGEN YIELDING COMPOSITIONS

William H. Schechter, Lawrence, Kans.

No Drawing. Application July 12, 1948,
Serial No. 38,195

5 Claims. (Cl. 252—187)

(Granted under the act of March 3, 1883, as
amended April 30, 1928; 370 O. G. 757)

This application is a continuation-in-part of application Serial Number 557,063 (abandoned) filed October 3, 1944, for Chlorate candles as oxygen yielding compositions.

My invention relates to improvements in oxygen generating compositions, particularly with a view to improving the oxygen yield per unit volume of the oxygen generating composition.

In all preparations for the generation of oxygen by decomposition of a chlorate or peroxide much attention is given to obtaining as large as possible a yield of oxygen per unit volume of composition and to obtaining satisfactory purity of the gas. The latter problem is rather easily solved by providing for filtration of the gas and using pure, carbon-free materials to avoid carbon monoxide and carbon dioxide formation. Provision can be made for conversion of the carbon monoxide to the dioxide and for the absorption of the carbon dioxide before admitting the oxygen to breathing apparatus.

To increase the yield of oxygen per unit volume of composition, great effort has been expended in devising methods of molding compositions at higher and higher pressures in order to obtain denser and stronger products. The general practice has been to mix ingredients in the proper proportions, moisten the mass, mold it under as high a pressure as possible, remove the mass from the mold and dry it. By such means, it has been possible to obtain candles of densities from 1.7 to 2.0 grams per cubic centimeter.

The following table summarizes the properties and compositions of several typical molded chlorate oxygen candles:

Table I

| | British | | Commercial American Products | |
|---|---|---|---|---|
| | Small | Large | Small | Large |
| Composition: | | | | |
| $NaClO_3$...........percent.. | | 79 | 74 | 74 |
| $KClO_3$.............do.... | 73.5 | | | |
| Fe..................do.... | 11.5 | 5.5 | 10 | 10 |
| Asbestos............do.... | 12.1 | 12.6 | | |
| Glass...............do.... | | | 12 | 12 |
| $BaO_2$..............do.... | 2.0 | 2.0 | 4 | 4 |
| Cu..................do.... | .8 | .8 | | |
| $NiCO_3$.............do.... | .1 | .1 | | |
| Data: | | | | |
| Density............. | 1.8 | 1.7 | 2.0 | 1.9–2.0 |
| Liters $O_2$/g. candle... | .19 | .24 | .225 | .225 |
| Percent $O_2$ by wt.... | 28 | 36 | 33 | 33 |
| Liters $O_2$/cc. candle.. | .34 | .41 | .45 | .45 |

It is the primary object of my invention to prepare a chlorate oxygen candle of substantially higher density than those now available so that an increased volume of oxygen can be had per unit volume of candle.

It is a secondary object of my invention to provide a novel method of compounding and preparing my dense candle.

Other objects and advantages of my invention will in part be obvious and in part appear hereinafter.

My invention accordingly comprises the several steps and relation of one or more of such steps with respect to each of the others, and the oxygen candle possessing the features, properties, and the relation of elements, which are exemplified in the following detailed disclosure, and the scope of the invention will be indicated in the claims.

Many authorities state positively that chlorates are explosive when heated to the melting temperature. See, for example, "A Comprehensive Treatise on Inorganic and Theoretical Chemistry," J. W. Mellor, vol. II, page 310; "Inorganic Chemistry," Fritz Ephraim, 4th ed., page 374, wherein both authorities state positively that chlorates are explosive when heated to the melting temperature and are particularly explosive when heated in the presence of finely divided metals.

I have discovered that carefully controlled heating of chlorates will result in their fusion without danger of explosion. By heating an alkali metal chlorate mixture slowly at the rate of about 10 degrees per minute and being careful, by agitation and stirring of the mixtures, that the temperature of no appreciable part of the heated mass exceeds the melting point by more than 10 to 20 degrees centigrade in temperature the mixture can be heated to its melting point and rendered fluid enough to be poured and cast. It is well not to heat the mixture more than 10 to 20 degrees centigrade above its melting temperature in order to avoid starting its decomposition.

I have carried this principle over into the preparation of a chlorate candle for use as an oxygen generator and have succeeded in preparing candles of substantially the same composition as the molded types now available but having a greatly increased density and hence oxygen yield per unit volume of candle. Fused candles can be made only from highly purified chemicals. No heavy metal salts of copper, nickel, cobalt etc. can be present or decomposition will take place at the fusion temperature. Free carbon, organic materials or carbon in iron must be eliminated as far as possible to prevent ignition on fusion and to lower the carbon monoxide content to an amount suitable for inhalable oxygen. Figures relating oxygen yield per unit weight of composition would have little meaning for in all case the oxygen is derived from a chlorate and the amount per unit weight of chlorate used in the composition should be the same substantially.

The relative proportions of the sodium chlorate may vary between 70% and 90% by weight of the composition. But for reasons of balancing a low oxygen yield against a slow rate of burning the optimum sodium chlorate content is around 80% by weight, preferably about 83%. My method of preparing a candle and my preferred composition therefore are given in detail in the following example.

EXAMPLE

The preferred oxygen source is sodium chlorate of which 83 parts by weight are mixed with 7 parts of carbon-free powdered iron, 7 parts of short fiber glass wool and 3 parts of powdered barium peroxide. The dry ingredients are mixed thoroughly and heated slowly in an iron retort at a rate of about 10° C. per minute, care being taken at all times to keep the mass at substantially uniform temperature throughout by agitating, stirring and cutting the material loose from the sidewalls of the retort. The mass is heated to a temperature of 255° C. which is about 3° C. above its melting temperature. When fluid, the mass, which at this temperature is a thick viscous fluid, is poured into cups or shells and allowed to set into solid candles the shape of the form used.

I prefer to use sodium chlorate for it represents a good compromise in properties. Lithium chlorate, although usable and highly advantageous from the standpoint of weight, is too deliquescent for convenience. Potassium chlorate, on the other hand, although it is not deliquescent to any great extent, is too heavy. Sodium chlorate is not very deliquescent and is reasonably light.

In the fusion it is best to carry the heating to the point at which the mixture just melts sufficiently to pour. Heating substantially beyond the melting point involves the danger of starting decomposition and also the possibility that the iron in the mix will have time to settle during the cooling.

In the following table I have summarized the properties of my fused candles as compared with the large British type, given in Table I, and with pure sodium chlorate:

*Table II*

| Composition | | British | Pure Salt | Composition Preferred |
|---|---|---|---|---|
| $NaClO_3$ | percent | 79 | 100 | 83 |
| Fe | do | 5.5 | | 7 |
| Asbestos | do | 12.6 | | |
| Glass | do | | | 7 |
| $BaO_2$ | do | 2 | | 3 |
| Cu | do | 0.8 | | |
| $NiCO_3$ | do | 0.1 | | |
| Density | | 1.7 | 2.5 | 2.4 |
| Percent $O_2$ by wt | | 36 | 45 | 37 |
| Liters $O_2$/cc candle | | .41 | .79 | .60 |

It is apparent from the above table that the density of my candle is about 40% greater than this British product, which is accepted for use in submarines and its density is about 20% greater than the denser of the two American products listed in Table I. While my composition in comparison with that of the British shows about 4 percent more $NaClO_3$ and about 1 percent more $BaO_2$, the actual available content of oxygen by weight is only about 1 percent more. These two compositions are directly comparable for the same burning conditions.

Furthermore, my composition, by reason of its greater density as shown in this table liberates approximately 50 percent more oxygen per unit volume than the British composition. This can not be attributed to the 1 percent greater available content of oxygen by weight of my composition, but is due almost entirely to the greater density thereof.

Fused and molded materials produce candles of arcuate cylindrical dimensions, which remain so during the burning process. Pressed candles, on the other hand, generally warp both in the drying operation and during the burning. For candles to be used in permanent apparatus warping in either case renders them unsatisfactory for the reason that it is almost impossible to insert such candles in the apparatus and to remove the sintered mass after burning.

Compositions in which potassium chlorate replaced the sodium chlorate gave comparable performance.

The last step in the preparation of a candle involves setting the fuse in place. The fuse is made up separately, placed in the bottom of the mold and candle cast on it.

The fuse is made of the same materials as the candle proper, but the iron and glass percentages are increased with a corresponding decrease in chlorate. This gives a faster burning mixture than the candle and one that is readily ignited with a red phosphorus "scratcher."

When ignited the candles made according to my method will burn at a rate such that a candle measuring 1⅝" in diameter and 6" in length will burn uniformly for 20 to 22 minutes and deliver during the entire period oxygen at a rate of about six liters per minute (S. T. P.).

Chlorate candles can be made in various sizes to accommodate various needs. The small size in the form of a solid cylinder measuring 1⅝" in diameter and 6" long is usable in portable breathing apparatus such as those used in mines and high-flying aircraft. A similar size is usable as an oxygen source in hospital breathers. A larger candle, weighing 12 pounds and measuring 3¾" in diameter and 14" in length is usable in submarines and will supply enough oxygen to refresh the air for 65 men for one hour.

The advantages of my invention can be summarized as follows:

The fusion method of production yields a substantially denser product and consequently a more concentrated stored oxygen supply, The product, weight for weight, gives substantially more than does a conventional cylinder of oxygen, The product, as compared with molded candles of similar composition, gives a much improved yield of oxygen.

Since certain changes, within safe limits, in carrying out the above process and certain modifications in the composition of the fused candle which embodies the invention can be made without departing from its scope, it is intended that all matter contained in the above description shall be interpreted as illustrative and not in a limiting sense.

The invention described herein may be manufactured and used by or for the Government of the United States of America for governmental purposes without the payment of any royalties thereon or therefor.

What is claimed is:

1. As a gaseous oxygen source, a fused chlorate candle, consisting essentially of from about 70% to about 90% by weight of an alkali metal chlorate, a minor amount of iron sufficient to maintain the decomposition of the chlorate upon ignition thereof, and in amount of inert filler approximately equal to that of the iron.

2. As a gaseous oxygen source, a fused candle, consisting of about 70% to 90% of sodium chlorate and the residue a mixture of substantially equal parts of substantially carbon-free iron and an inert filler.

3. A fused chlorate candle, comprising, about 83% of sodium chlorate, 7% of finely divided iron, 7% of inert filler, and 3% of barium peroxide.

4. A fused chlorate candle composition characterized by its high density as compared with molded candles of the same composition, consisting of about 80% of sodium chlorate, about 30% of an alkaline earth metal peroxide and the residue substantially equal parts of iron and fibrous glass.

5. The method of preparing a fused, undecomposed chlorate candle characterized by its relatively high density, consisting in heating in an iron retort a mixture of ingredients as defined in claim 3 at a rate of not more than 10 degrees Centigrade per minute to a temperature above its melting point by not more than 10 to 20 degrees Centigrade, agitating, stirring, mixing and cutting loose the mixture from the side walls of the retort to promote an even distribution of the heat throughout said mixture during the heating operation and while in fused condition casting the molten mass in the desired form.

WILLIAM H. SCHECHTER.

No references cited.